United States Patent [19]

Melchior

[11] Patent Number: 4,552,741

[45] Date of Patent: Nov. 12, 1985

[54] METHOD AND APPARATUS FOR MANUFACTURING SYNTHESIS GAS

[75] Inventor: Eckhard Melchior, Dachau, Fed. Rep. of Germany

[73] Assignee: M.A.N. Maschinenfabrik Augsburg-Nurnberg Aktiengesellschaft, Fed. Rep. of Germany

[21] Appl. No.: 656,867

[22] Filed: Oct. 2, 1984

[30] Foreign Application Priority Data

Oct. 12, 1983 [DE] Fed. Rep. of Germany ....... 3337078

[51] Int. Cl.$^4$ .............................................. C01C 1/04
[52] U.S. Cl. ................................... 423/359; 252/373; 422/190; 422/204; 423/652
[58] Field of Search ............... 423/652, 650, 651, 653, 423/654, 359; 252/373; 422/190, 196, 198, 201, 204

[56] References Cited

U.S. PATENT DOCUMENTS

| | | | |
|---|---|---|---|
| 2,592,591 | 4/1952 | Odell | 422/190 |
| 3,785,953 | 1/1974 | Patouillet et al. | 422/190 |
| 4,162,290 | 7/1979 | Crawford et al. | 422/190 |
| 4,233,268 | 11/1980 | Boret et al. | 422/190 |
| 4,391,793 | 7/1983 | Boese | 423/652 |

OTHER PUBLICATIONS

Strelzoff, *Technology and Manufacture of Ammonia* (1981), John Wiley & Sons, pp. 104–110.
Kirk-Othmer, *Encyclopedia of Chemical Technology*, Third Edition, vol. 12 (1980), John Wiley & Sons, p. 944.

*Primary Examiner*—John Doll
*Assistant Examiner*—Wayne A. Langel
*Attorney, Agent, or Firm*—Scully, Scott, Murphy and Presser

[57] ABSTRACT

Method and apparatus for generating synthesis gas, such as hydrogen through the catalytic conversion of hydrocarbons under heat. In order to reduce the fuel energy losses associated with such chemical processes, the reactors filled with a catalyzer are at least partially heated by the direct or indirect effects of solar energy. The residual products obtained from the chemical process, after separation of the synthesis gas are combusted to heat a reformer furnace containing a second catalyzer. Flue gas heat is utilized for generating steam. The system can be directly connected to an ammonia synthesis system.

5 Claims, 1 Drawing Figure

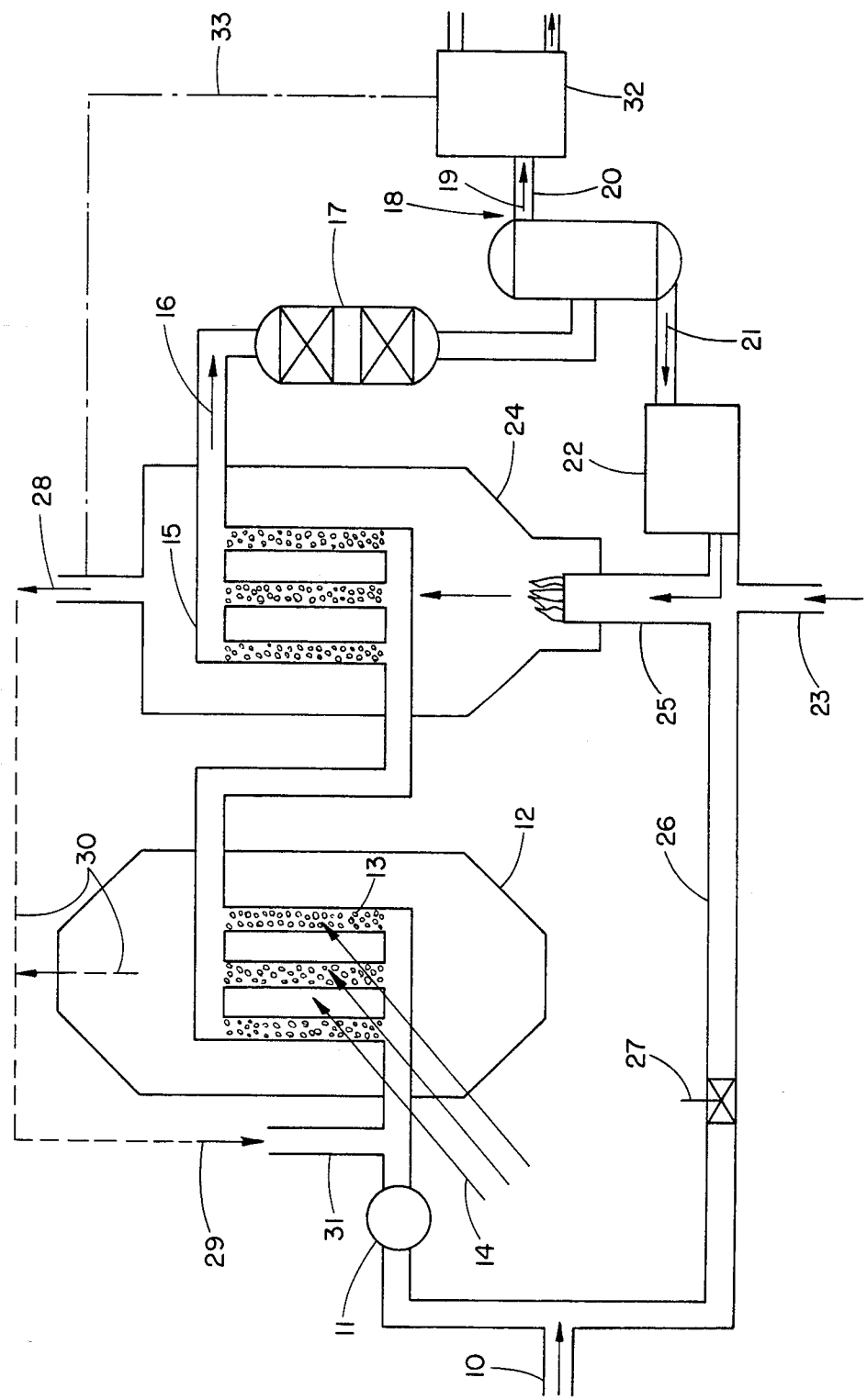

METHOD AND APPARATUS FOR MANUFACTURING SYNTHESIS GAS

BACKGROUND OF THE INVENTION

1. Field of the invention

The present invention relates to a method and to an apparatus for the manufacturing of synthesis gas, in particular hydrogen, through the catalytic conversion of hydrocarbons under the influence of heat.

2. Discussion of the Prior Art

Synthesis gases are produced in large quantities as mixtures or mixed products for the manufacture of such products as hydrocarbons, alcohols and ammonia. During the course of the chemical processes in the manufacture of such synthesis gases, there are encountered considerable energy losses which are covered or compensated for by the energy of fossil fuels primarily those based on petroleum.

SUMMARY OF THE INVENTION

Accordingly, it is a basic object of the present invention to provide a method of the above-mentioned type which renders it possible to reduce the fuel energy losses.

It is a more specific objection of the present invention to provide a method for the production of synthesis gases in which catalysts effecting the conversion of the hydrocarbons under heat are at least partly heated through the direct or indirect effect of solar energy.

Through the coupling in of solar energy into the reactor with at least one catalyzer or steam reformer, there is replaced at least a portion of the high-grade fuels, thereby rendering possible the effectuation of the process at an extremely high degree of thermodynamic efficiency.

The heating through solar energy can be carried out either directly by constructing the reactor or the steam reformer as a solar absorber, or indirectly through the utilization of intermediate heat carriers.

Preferably, there are employed two reactors which are connected in series, of which the reactor arranged upstream in the flow direction is heated by solar energy, and the reactor arranged downstream in the flow direction is heated through the combustion of the residual product from the synthesis gas production process.

In this manner, it is possible to achieve a self-sufficient, continuous operation of the chemical process, in which the residual products need not be conducted off for further utilization but are utilized in the process itself for additional savings in fuel energy. The residual heat from the waste or flue gases can additionally be advantageously employed for the generation of process steam.

Pursuant to a further aspect of the present invention, the method is used for the production of ammonia via synthesis gas. In the instance, there can also be employed the residual heat from the flue gases for the necessary heating of the air and of the feed stock materials.

In numerous sunny countries, ammonia which is used in the manufacture of fertilizers is frequently the first product of a beginning or infant industrialization, which is used at or near the manufacturing location or neighborhood and induced with the utilization of the inventive method at the location of consumption; thereby eliminating the need for expensive infrastructures such as, for example, distribution networks or pipeline systems for remote energy distribution systems.

The flue gas heat from the combustion of residual products which is available at below the process temperature, can be completely utilized for the generation of the necessary process steam and for the preheating of air and feed stock for the ammonia process. This utilization of the waste or exhaust leads to systems which spontaneously and self-sufficiently provide energy, and thereby additionally to a high overall efficiency in the utilization of solar energy.

The present invention also provides for a novel apparatus for implementing the inventive method, in which the apparatus includes at least one reactor with at least one catalyzer which is heatable with solar energy.

BRIEF DESCRIPTION OF THE DRAWING

Reference may now be had to the following detailed description of an apparatus for the manufacture of synthesis gas, taken in conjunction with the single figure of the drawing illustrating a schematic representation thereof.

DETAILED DESCRIPTION

For manufacturing hydrogen, the raw material or feed stock is conveyed to a catalyzer 13 which is arranged in a reformer 12, through a fuel feed line, is particular a natural gas feed line 10, and through a feed pump 11. The catalyzer 13 is constructed as a solar absorber which is exposed to solar radiation 14. The above-mentioned first reformer with a catalyzer 13 has a secondary reformer with a catalyzer 15 connected thereto downstream thereof. The natural gas 10 which is converted by the catalyzers 13 and 15 is conducted through a CO converter 17 to a pressure-changing adsorption washer 18, in which the hydrogen 19 is separated out and conducted off through a discharge conduit 20. The residual product or residual gas 21 is conveyed to a storage 22, from which the combustible product is combusted, with the addition of air 23 in a reformer furnace 24 as needed so as to heat the secondary reactor with a catalyzer 15 whenever the available solar energy 14 is inadequate for the maintenance of a continuous operation. The fuel in feed conduit 25 for the reformer furnace 24 is connected with the fuel supply 10 through a conduit 26 and a valve 27, such that, during a protracted lack of solar radiation and after consumption of the stored residual product, the reformer furnace 24 can be maintained in operation through the use of primary energy.

The final temperature of the primary reformer 12 is so selected that, similar to a Braun purifier process or at a subsequent pressure-changing adsorption process a major portion of the methane will not be converted. This renders possible more milder conditions for the operation of the catalyzer tubes 15 in the reformer furnace 24 and, subsequent to separation of the hydrogen 19 from the remaining reaction products 21, enables the residual gases 21 to be employed for sustaining the process with fossil fuels during periods when solar operation is not possible; for example, during the night, under cloudy skies, and thereby the maintenance of a continuous operation.

The solar energy, as well as the thermal energy of the flue gases 28 from the reformer furnace 24, are used for the generating of steam 29, as illustrated by the phantom lines. The steam 29 is admixed with the fuel through an infeed conduit 31 for the reforming process.

The system as described herein in the utilization of hydrogen 19 for the production of ammonia is connected to an ammonia synthesis system which is generally identified by the reference numeral 32, herein, the available flue gas heat 28 which is below process temperature, besides being utilized for the generating of steam 29, is also used for preheating 33 air and feed stock material for the ammonia process. The entire system thus represents a self-sustained energy system in which there is not only conserved primary energy, but there are also eliminated length pipelines which, under circumstances are needed for transport.

Through the coupling of solar energy into the above-described process, there is obtained an improved energetic efficiency in comparison with other solar energy utilizing systems; for instance, as employed for the generation of electrical power.

In lieu of constructing solar the reactor with a catalyzer as a solar absorber, the heating thereof by solar energy can also be effected indirectly through the use of intermediate heat carriers, for example, such as a fluid.

What is claimed is:

1. Method for the manufacture of a synthesis gas comprising hydrogen, through the catalytic steam reforming of hydrocarbons under the influence of heat comprising: passing a mixture of steam and hydrocarbons through two catalytic reforming reactors connected in series under conditions effective to provide synthesis gas wherein the endothermic heat of reaction in the first reactor is provided by solar energy, the endothermic heat of reaction in the second reactor is provided by combustion of the residual products obtained from the synthesis gas generation process, and the steam is generated from the flue gas heat obtained from the combustion of the residual products.

2. Method as claimed in claim 1 comprising producing ammonia from the synthesis gas.

3. Apparatus for the manufacture of a synthesis gas comprising hydrogen through the catalytic steam reforming of hydrocarbons under the influence of heat comprising:

(a) a first catalytic steam reforming retractor,
   (b) a second catalytic steam reforming reactor,
   (c) means to pass a mixture of steam and hydrocarbons in serial fashion through said first and second reactors to provide synthesis gas,
   (d) means to heat said first reactor by solar energy, and
   (e) means to heat said second reactor by combustion of residual products from synthesis gas generation.

4. Apparatus as claimed in claim 3, wherein said (d) means comprises a solar energy absorber.

5. Apparatus as claimed in claim 3, including a storage means for the residual products of the synthesis gas generation process.

* * * * *